(12) United States Patent
Pflanz et al.

(10) Patent No.: US 11,666,840 B2
(45) Date of Patent: Jun. 6, 2023

(54) LIQUID FILTERING SYSTEM

(71) Applicant: Sartorius Stedim Biotech GmbH, Goettingen (DE)

(72) Inventors: Karl Pflanz, Goettingen (DE); Sebastian Pruehl, Wehnde (DE); Andreas Pickl, Klein Schneen (DE); Roland Leetsch, Bovenden (DE); Adam Gilbert, Bristol (GB); Martin Purshouse, Clevedon (GB)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 0 days.

(21) Appl. No.: 17/145,058

(22) Filed: Jan. 8, 2021

(65) Prior Publication Data
US 2021/0129057 A1     May 6, 2021

Related U.S. Application Data

(63) Continuation of application No. PCT/EP2019/062214, filed on May 13, 2019.

(30) Foreign Application Priority Data
Jul. 10, 2018    (EP) ..................................... 18182730

(51) Int. Cl.
    *B01D 35/30*       (2006.01)
    *B01D 29/085*     (2006.01)
    *B01D 35/14*       (2006.01)
(52) U.S. Cl.
    CPC ......... *B01D 35/306* (2013.01); *B01D 29/085* (2013.01); *B01D 35/14* (2013.01);
(Continued)

(58) Field of Classification Search
    CPC .... B01D 35/306; B01D 29/085; B01D 35/14; B01D 2201/16; B01D 2201/204; B01D 2201/305; B01D 37/00; B01D 35/30
See application file for complete search history.

(56) References Cited

U.S. PATENT DOCUMENTS

2002/0098125 A1    7/2002   Roberts et al.

FOREIGN PATENT DOCUMENTS

| EP | 3056276 A2 | 8/2016 |
|---|---|---|
| JP | S55115315 U | 8/1980 |

(Continued)

OTHER PUBLICATIONS

European Search Report, EP18182730, dated Jan. 9, 2019, 8 pages.
(Continued)

*Primary Examiner* — Waqaas Ali
(74) *Attorney, Agent, or Firm* — Edell, Shapiro & Finnan, LLC

(57) ABSTRACT

A filtering system (10) includes a filtering apparatus having a filter unit for receiving liquid to be filtered, a receptacle for receiving filtered liquid, and an adapter (14) for coupling the filter unit to the receptacle, and also includes a base (12) having a cradle (26) for receiving the filtering apparatus and a base vacuum delivery port (28). The adapter includes an adapter vacuum receiving port (22) coupled to the vacuum delivery port for driving the liquid through the filter and—as filtered liquid—into the receptacle. The cradle and the adapter have an interlocking mechanism (52, 54) that locks the filtering apparatus to the cradle in a locking position in which the vacuum receiving port is sealingly coupled to the base vacuum delivery port. The base vacuum delivery port has a vacuum valve (30) constituted as a normally-closed valve automatically forced open when the filtering apparatus locks to the cradle.

15 Claims, 4 Drawing Sheets

(52) U.S. Cl.
CPC .... *B01D 2201/16* (2013.01); *B01D 2201/204* (2013.01); *B01D 2201/305* (2013.01)

(56) References Cited

FOREIGN PATENT DOCUMENTS

| KR | 100175901 | B1 | | 3/1999 | | |
|----|-----------|----|----|--------|----|----|
| KR | 20150055866 | A | | 5/2015 | | |
| WO | 0072970 | A1 | | 12/2000 | | |
| WO | 2007028157 | A1 | | 3/2007 | | |
| WO | WO-2007028157 | A1 | * | 3/2007 | .......... | B01D 29/085 |
| WO | 2008144083 | A1 | | 11/2008 | | |
| WO | WO-2008144083 | A1 | * | 11/2008 | ............ | B01D 29/05 |
| WO | 2009014769 | A1 | | 1/2009 | | |
| WO | 2015032464 | A2 | | 3/2015 | | |
| WO | 2016131859 | A1 | | 8/2016 | | |

OTHER PUBLICATIONS

International Search Report, PCT/EP2019/062214, dated Jun. 27, 2019, 4 pages.
Korean Office Action with English translation, Application No. 10-2021-7004135, dated Jun. 29, 2022, 9 pages.

* cited by examiner

US 11,666,840 B2

LIQUID FILTERING SYSTEM

CROSS REFERENCE TO RELATED APPLICATIONS

This is a Continuation of International Application PCT/EP2019/062214 which has an international filing date of May 13, 2019, and the disclosure of which is incorporated in its entirety into the present Continuation by reference. This Continuation also claims foreign priority under 35 U.S.C. § 119(a)-(d) to and also incorporates by reference, in its entirety, European Patent Application 18182730.4 filed on Jul. 10, 2018.

FIELD OF INVENTION

The invention relates to a liquid filtering system comprising:

a filtering apparatus having a filter unit for holding a filter and for receiving liquid to be filtered, a receptacle for receiving filtered liquid, and an adapter for coupling the filter unit to the receptacle, wherein the adapter comprises an adapter vacuum receiving port to be coupled to a vacuum delivery port in order to apply a vacuum driving force for driving the liquid to be filtered through the filter and—as filtered liquid—into the receptacle, and a base having a cradle for receiving the filtering apparatus and a base vacuum delivery port to be coupled, on one side, to a vacuum source and, on the other side, to a vacuum receiving port, said cradle and said adapter having an interlocking mechanism that locks the filtering apparatus to the cradle in a locking position, in which the adapter vacuum receiving port is sealingly coupled to the base vacuum delivery port.

BACKGROUND

Liquid filtering systems of said kind are known from WO 2007/028157 A1.

That document discloses a liquid filtering system with a filtering apparatus essentially consisting of a bottle on top of which a filter funnel is fixed by an adapter. On the bottom of said filter funnel there is a filter layer through which a liquid filled into the funnel is filtered and output into the bottle. In order to apply a driving force to drive the liquid through the filter layer into the bottle, said bottle is coupled to a vacuum source wherein the associated vacuum receiving port is part of said adapter. Said adapter vacuum receiving port essentially is a vertically directed, downward-facing hole constituting the end of an internal conduit. A corresponding upward-facing hole constituting the end of a connection conduit to the vacuum source is located on the rim of a cradle held by a base stand. When the filtering apparatus is positioned in said cradle the two corresponding holes become superimposed, and pure gravity establishes a sealed vacuum connection. The stand contains a vacuum valve coupled to said vacuum connection conduit, to turn the vacuum on and off.

Disadvantageously, the prior art liquid filtering system is easy to operate incorrectly. Especially the sealed vacuum connection is quite instable. Also, after having positioned the filtering apparatus in the cradle the vacuum has to be turned on and it has to be turned off after the filtering process has finished. These are both performed in separate steps, which is time consuming and likely to be accidently omitted.

In WO 2015/032464 A2 a filter device for filtering complex fluid samples with two filter funnels that are arranged sequentially is described. An intermediate connector is provided downstream of the first filter funnel and upstream of the internal space of the second filter funnel, which is dimensioned to receive the volume of a sample fluid. This intermediate connector has a port and/or vent for communicating the internal space of the second filter funnel with an external gas source/atmosphere and/or a vacuum source via a valve arrangement. The valve is a manually operated three-way-valve that can be either integral with the intermediate connector or externally connected to or connectable to the port of the intermediate connector.

A multi-well filtration or solid phase extraction apparatus which generally includes a vacuum collar adapted to be interconnected between a conventional 96-well sample application plate, or separation plate, and a 96-well collection plate is known from US 2002/0098125 A1. The vacuum collar provides an interface chamber between these plates through which a vacuum can be applied to assist in the filtration process. The collection plate may include a vent opening providing a direct communication between the interface chamber and a vacuum assembly air intake, when the collection plate is disposed on top of the vacuum assembly in a stacked configuration, thereby eliminating any need for separate vacuum manifolds or connectors. The vacuum collar may include a valve in communication with the chamber. The valve may be used to facilitate venting of the system as needed and may be opened and closed with a handle.

WO 2009/014769 discloses a portable fixture for supporting a vacuum filtration device. To provide a vacuum to the filtration device, the portable fixture may have a vacuum inlet port which may be connected to a vacuum source and a vacuum outlet port that is fluidly connected to the vacuum inlet port. The vacuum flow is controlled by a vacuum flow control knob which includes a manually operable valve.

In WO 2008/144083 A1 methods and an apparatus for foam control in a vacuum filtration system are described. The liquid filtering system includes an upper sample reservoir, a filter and a lower storage bottle. A vacuum is applied below the sample filter to draw sample liquid through the sample filter into the storage bottle. The vacuum may be regulated by an external vacuum flow control unit.

A cartridge for conducting a chemical reaction is known from WO 00/72970 A1. The cartridge includes a body having at least one flow path formed therein as well as a reaction vessel extending from the body for holding a reaction mixture for chemical reaction and optical detection. The vessel comprises a rigid frame defining the side walls of a reaction chamber. The frame includes at least one channel connecting the flow path to the chamber. The vessel also includes flexible films or sheets attached to opposite sides of the rigid frame to form opposing major walls of the chamber. In addition, at least two of the side walls are optically transmissive and angularly offset from each to permit real-time optical detection of an analyte in the reaction chamber.

EP 3 056 276 A2 discloses a vessel which can be used for sample preparation, including purification or concentration of samples, particularly protein samples. The fluid containment pressure vessel provides an improved cap-to-body interface. The cap may be threaded and threadingly engage with the body of the pressure vessel. An interlock mechanism may prevent the cap from being opened while the device is under pressure. A pressure relief valve provided with a pre-loaded biasing mechanism may achieve the required pressure release rate.

In WO 2016/131859 A1 a method and system for storing and transporting tissue samples immersed in a fluid are described. An assembly comprising a cap prefilled with a fixative solution, a valve, and a container for storing a tissue sample are provided. The valve is adapted to be situated between the cap and the container such that fluid can flow from the cap into the container when the assembly is upright, but the fluid cannot backflow from the container to the cap when the assembly is horizontal or inverted.

SUMMARY

One object addressed by the invention is to provide a liquid filtering system that is easier to handle and is better protected against inproper operation.

The above mentioned object is addressed by a liquid filtering system as claimed in the independent claims, especially by a liquid filtering system characterized in that the base vacuum delivery port comprises a vacuum valve constituted as a mechanical, normally-closed valve that is automatically forced open when the filtering apparatus is locked to the cradle.

Preferred embodiments of the invention are addressed by the dependent claims.

According to an aspect of the invention, the principal vacuum valve is not a manually operable valve but rather is a valve that is normally, i.e. whenever the filtering apparatus is not located in the cradle, in its closed state. This function is realized purely mechanically. For example, this vacuum valve may comprise a vacuum channel, a valve body being coaxially dislocatable within said vacuum channel, and a valve seat against which said valve body is sealingly pressed by an associated spring. On the other hand, the filtering apparatus, especially its adapter, comprises a structure that automatically opens said vacuum valve when the filtering apparatus is locked to the cradle. For example, the adapter may comprise a stiff pipe socket that is introduced into said vacuum channel when the adapter is locked to the cradle. The pipe socket comes into contact with the valve body and dislocates it within the vacuum channel, thereby opening the vacuum valve. As soon as the filtering apparatus is removed from the cradle the vacuum valve closes again. This not only renders the whole system safe against being operated improperly but also saves operation time and, thus, renders the system more efficient.

In a preferred embodiment, the adapter vacuum receiving port comprises, as exemplarily mentioned above, a stiff pipe socket which, in the locking position, extends through a base port opening of said base vacuum delivery port, dislocating a valve body of said vacuum valve from its closing position to its opening position. In particular, the pipe socket may dislocate said valve body against a reset force of a spring that applies a closing force to said valve body. The reset force has to be stronger than the vacuum force exercised by the vacuum source, in order to prevent the valve from being sucked open by the vacuum.

In terms of a practical construction said vacuum valve may comprise:

a vacuum channel ending at said base port opening, said valve body being coaxially dislocatable within said vacuum channel, and a valve seat against which said valve body is sealingly pressed when in said closing position, wherein said pipe socket, in said locking position, extends coaxially into said vacuum channel.

In order to establish a sealed vacuum connection between the base vacuum delivery port and the adapter vacuum receiving port said base vacuum delivery port may comprise a vacuum sealing ring between said base port opening and said vacuum valve, said sealing ring, in said locking position, being sealingly penetrated by said pipe socket.

In a preferred embodiment said sealing ring is an elastomeric ring having a first axial end, a second axial end, and a central sector located axially between said first and second axial ends, wherein its clear diameter at said first and second ends is larger than the outer diameter of said pipe socket, and wherein its clear diameter at said central sector is as large as or smaller than the outer diameter of said pipe socket. In other words, in a longitudinal section the wall of said sealing ring is V-shaped. This shape implies two advantages. On the one hand, the slope closer to the base port opening facilitates the penetration of the pipe socket. On the other hand, the slope closer to valve provides a self-sealing effect on the basis of the so called Bernoulli Effect: A stream of air through an axially diminishing gap between two walls relatively movable to each other forces said walls to further approach each other and finally close said gap. Air may stream between the vacuum channel and the interior of the pipe socket through said openings.

Usually the valve body has the shape of a ball. Also, usually the pipe socket has a round profile. If a rectangularly cut, round-profiled pipe socket coaxially hits a ball-shaped valve body said valve body obstructs the entrance of said pipe socket running counter to the goal of opening the valve. Thus, in a preferred embodiment the side wall of said pipe socket may comprise at least one aperture located, in said locking position, axially between said valve body and said sealing ring.

Especially in the above mentioned preferred embodiment wherein the pipe socket is used to dislocate the valve body against some reset force it is advantageous if said interlocking mechanism of said adapter and said cradle constitutes a detachable snap-lock: the locking process takes place automatically as soon as the filtering apparatus is inserted into its locking position. Thus, a single-handed operation is possible.

Said detachable snap-lock may comprise two mutually opposing, resiliently pivotable, dented levers, projections of which, in said locking position, engaging behind corresponding projections of said cradle. During insertion of the filtering apparatus into the locking position said projections of said levers on the one hand and said corresponding projections of the cradle on the other hand collide thereby inducing a pivoting of said levers, i.e. an opening of said snap-lock. As soon as the filtering apparatus is finally positioned in its locking position, i.e. as soon as said projections can engage behind said corresponding projections, the levers snap back locking the filtering apparatus to the cradle so that even said (preferredly spring-generated) reset force of the valve body can no longer dislocate the filtering apparatus from its locking position.

To facilitate even more the process of locking the filtering apparatus to the cradle said cradle may provide two receiving positions for said filtering apparatus, namely said locking position and a pre-locking position, in said pre-locking position said interlocking mechanism being unlocked and said filtering apparatus being transferable to said locking position by its manually forced, transversal shifting movement guided by mutually interacting guiding elements of said adapter and said cradle. Thus, the filtering apparatus can be placed in the cradle without connection to the vacuum source. Especially, if a plurality of filtering processes are to be performed simultaneously a plurality of filtering apparatuses can be placed in a corresponding plurality of cradles in a preparing step without connection them to the vacuum source, i.e. without starting the filtering process. However, the mutual guiding elements, e.g. corresponding guiding rails, may engage. Then, by a pure transversal movement which can easily be carried out single-handed, the filtering apparatus may be transferred to its locking position implying a connection to the vacuum source, i.e. starting the filtering process.

It is even more preferred, if said pre-locking position also provides some (additional) locking feature of its own, especially an additional snap-lock, to provide a position, where the filtering apparatus is locked to the cradle without having established the vacuum connection. This position may be addressed as a secured pre-locking position. In other words, it is preferred, if said cradle provides a secured pre-locking position, in said secured pre-locking position additional locking elements being locked to lock said filtering apparatus to said cradle without sealingly coupling said base vacuum delivery port to said adapter vacuum receiving port. Said additional locking elements may partially use the same constructive features, e.g. certain protrusion of the cradle and/or the adapter, or may be extensions of the above mentioned interlocking mechanism. Alternatively, they may be constructively separate. It is possible (and even preferred) if two pre-locking positions are provided, namely said secured pre-locking position and an unsecured pre-locking position with no locking elements interacting. If the pre-locking position provides a locking feature of its own, i.e. if the (or one) pre-locking position is a secured pre-locking position, the filtering apparatus is safely secured, especially against being tipped over, in a position, where the vacuum connection is not yet established. Thus, establishing the vacuum connection and securing the filtering apparatus to the base become more independent from each another.

Said pipe socket may contain a preferably sterile gas filter. On the one hand, such filter may prevent contaminations (which might be hidden in the base vacuum delivery port) from entering the filtering apparatus. On the other hand, such filter may prevent foam generated in the filtering apparatus, especially in the receptacle, from reaching the vacuum valve and from being sucked to the vacuum generating system. Especially in view of the latter effect said gas filter preferably is a hydrophobic gas filter.

For safety reasons and especially in order to avoid a build-up of foam, said base may comprise an additional vacuum valve that is manually switchable between an opening state and a closing state as is, in principle, known from prior art. Said switchability may comprise a simple on/off-mechanism but may, alternatively, also comprise a mechanism for precisely controlling the vacuum strength. In view of the specific position of said additional vacuum valve one skilled in the art has the choice between different options. For example, the additional vacuum valve may be positioned within the cradle. Alternatively it may be positioned within a central base holder (see below).

Often, it is intended to perform several filtering processes more or less simultaneously. A preferred embodiment of the invention provides such function in a particularly space-saving manner. In this embodiment said base forms part of a plurality of identical bases, each of them being fixed to a central base holder having a central vacuum conduit that is connected to the base vacuum delivery port of each one of the plurality of bases.

Said central base holder may be a rotatable stand having a central post containing said central vacuum conduit, the plurality of bases extending radially from said post exhibiting their cradles radially outwardly. Thus, the central base holder and the bases make up a carousel into which the filtering apparatuses may be clipped one after the other is a very fast sequence.

Further features and advantages of the invention may be better understood from the following specific description as well as from the drawings attached.

DETAILED DESCRIPTION

Figure 1:
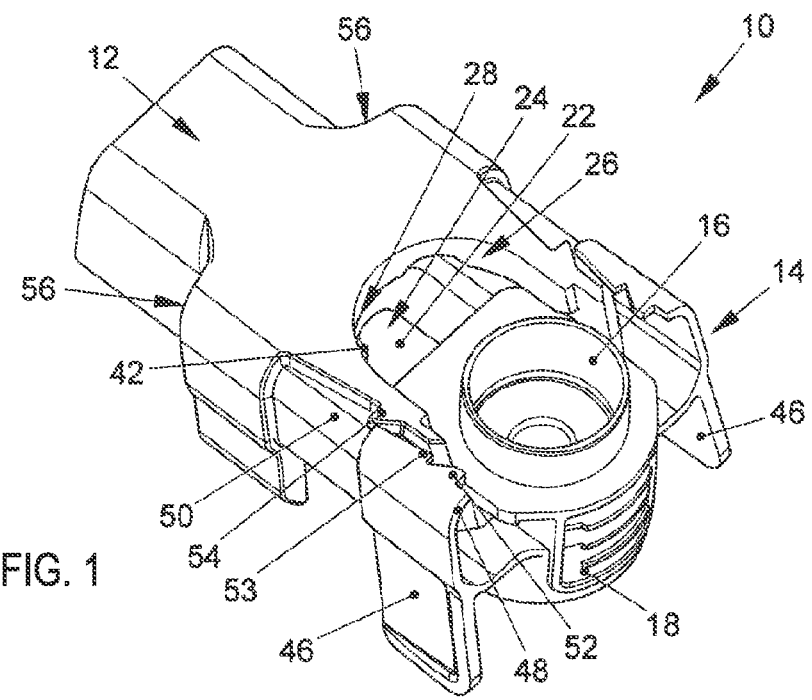
FIG. 1: a perspective view of a liquid filtering system according to the invention in its (unsecured) pre-locking position, wherein of its filtering apparatus only the adapter is shown.

In the drawings, like reference numerals designate like items.

Figure 2:
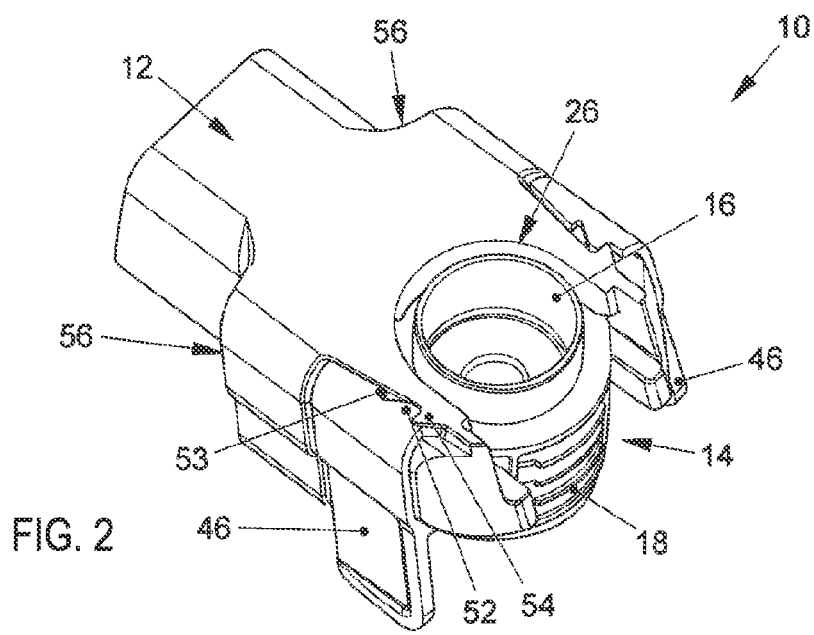
FIG. 2: a perspective view of the liquid filtering system of FIG. 1 in its locking position.
Figure 3:
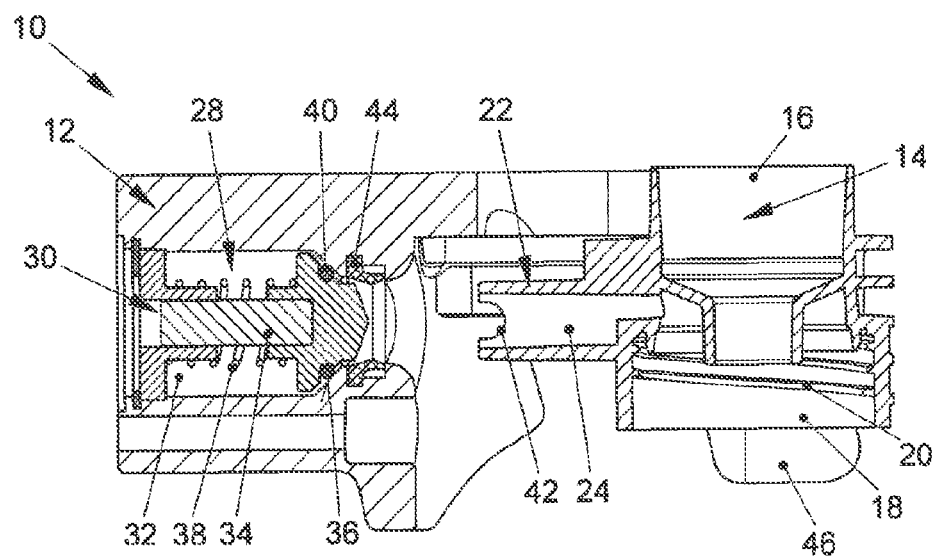
FIG. 3: a longitudinal section of the liquid filtering system of FIG. 1.
Figure 4:
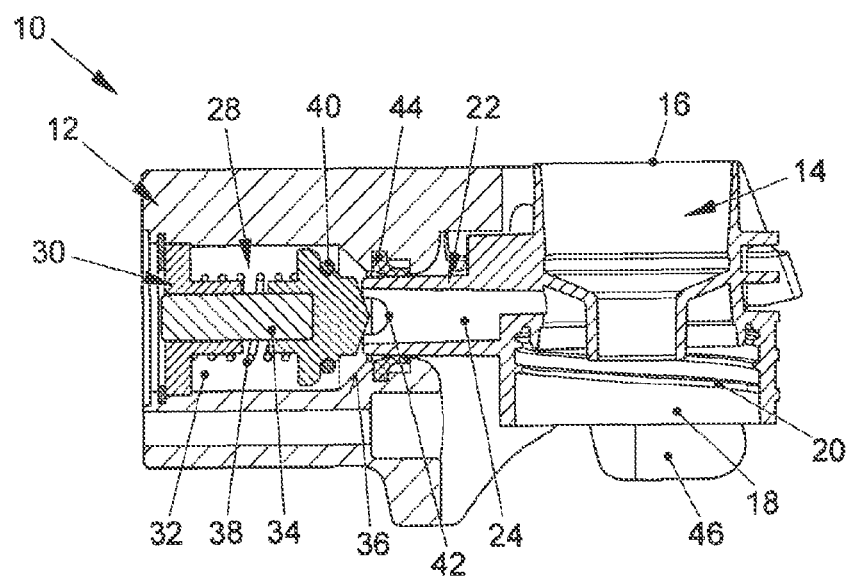
FIG. 4: a longitudinal section of the liquid filtering system of FIG. 2.
Figure 5:
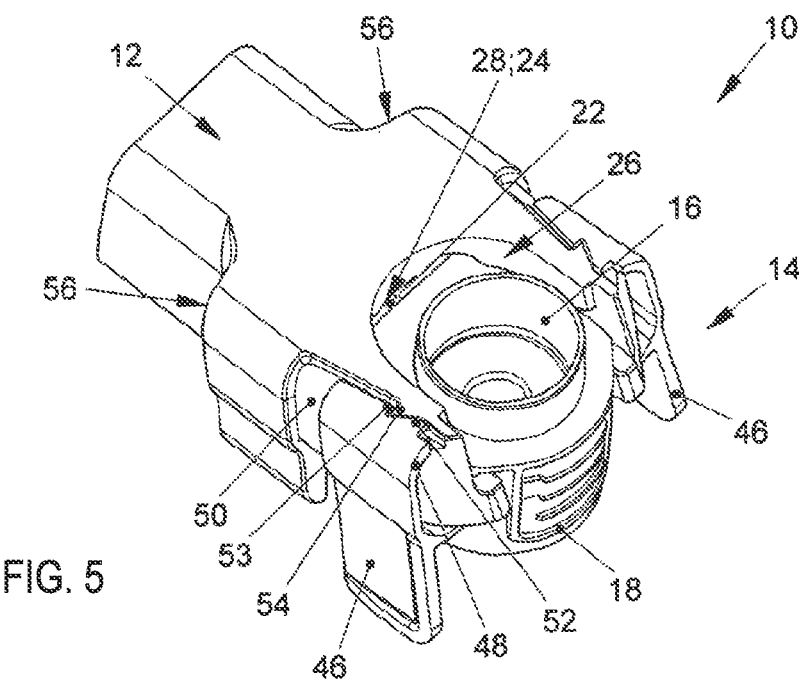
FIG. 5: a perspective view of a liquid filtering system according to the invention in its secured pre-locking position, wherein of its filtering apparatus only the adapter is shown.
Figure 6:
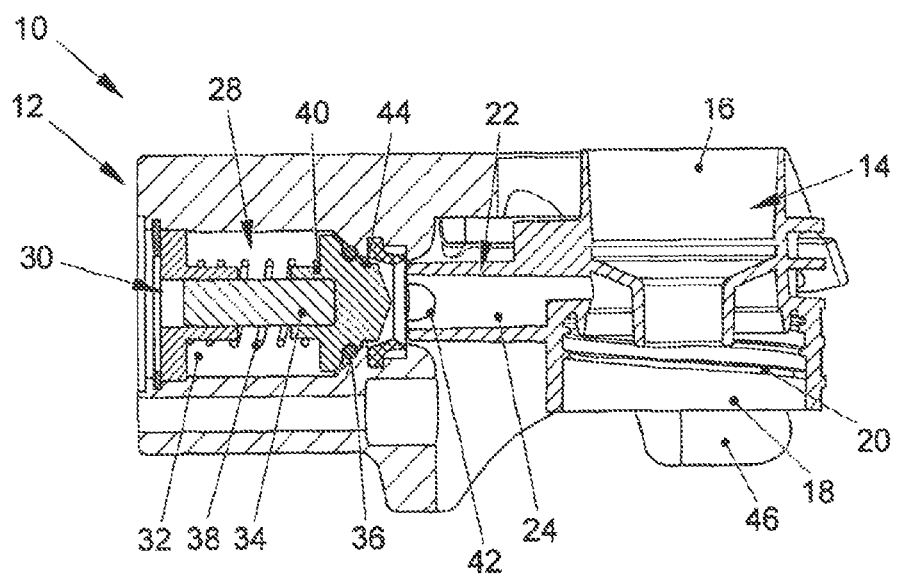
FIG. 6: a longitudinal section of the liquid filtering system of FIG. 5.
Figure 7:
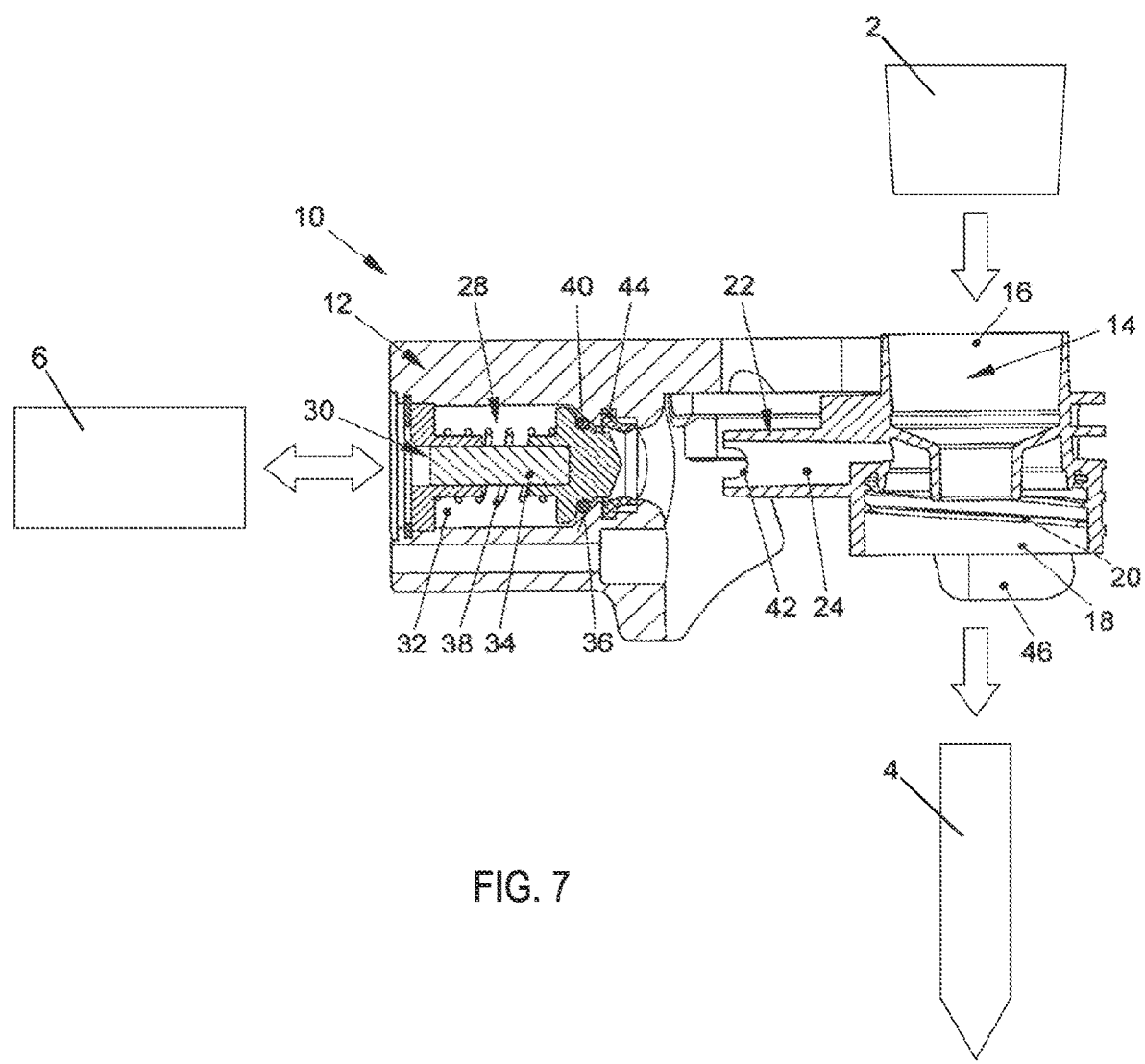
FIG. 7: a longitudinal section of the filtering apparatus shown with schematic sections of adjacent components of the liquid filtering system.

FIGS. 1 and 3 on the one hand and FIGS. 2 and 4 on the other hand illustrate a liquid filtering system 10 according to a preferred embodiment of the invention in its unsecured pre-locking position and in its locking position, respectively. FIGS. 5 and 6 illustrate an additional pre-locking position, namely a secured pre-locking position. Finally, FIG. 7 shows the liquid filtering system 10 in relation to further, schematically illustrated components of the liquid filtering system. As far as possible said figures are discussed and should be understood together in the following.

The system shown comprises a base 12 and a filtering apparatus of which, for the sake of clarity, only its adapter 14 is shown. The adapter 14 comprises an upper interface 16 to be connected with a filter unit 2 (see FIG. 7), especially a filter funnel, to hold a filter layer and to receive the liquid to be filtered. The adapter 14 also comprises a lower interface 18 to be screwed, with a thread 20 to the neck of a receptacle 4 (see FIG. 7), especially a bottle, to receive filtered liquid from the filter unit.

Finally, the adapter 14 comprises an adapter vacuum receiving port 22, which may be coupled to a vacuum source 6 (see FIG. 7) in order to apply a low pressure in the receptacle inducing a vacuum driving force to drive the liquid to be filtered through the filter layer and—as filtered liquid—into the receptacle. Thus, the adapter vacuum receiving port 22 is connected to the lower interface 18 of the adapter 14. The adapter vacuum receiving port 22 comprises a pipe socket 24 extending perpendicular to the liquid flow direction through the adapter 14 and constituting a third interface of the adapter 14.

The base 12 comprises a cradle 26 to receive the adapter 14 and a base vacuum delivery port 28 to be coupled to the adapter vacuum receiving port 22. Said base vacuum delivery port 28 comprises a vacuum valve 30 essentially consisting of a vacuum channel 32, a valve body 34 and a valve seat 36 against which the valve body 34 is sealingly pressed by a spring 38. In order to provide a secure vacuum sealing the valve body 34 is armed with a gasket 40 within its contacting area to the valve seat 36. The vacuum valve 30 may, on its end averted to the adapter 14, be connected to the vacuum source, especially via a central vacuum conduit (not shown) inside a central base holder (not shown) to which the base is fixed, especially as one of a plurality of bases. The force of the spring 38 is directed towards the adapter 14, i.e. it is a reset force closing the vacuum valve 30 against the suction of the vacuum source.

When coupling the adapter 14 to the cradle 26 in the (unsecured) pre-locking position (FIGS. 1 and 3) the pipe socket 24 is not or only exiguously inserted into the base vacuum delivery port 28, as can be seen in FIG. 3. When being transferred to the locking position (FIGS. 2 and 4), the pipe socket 24 further intrudes into the base vacuum delivery port 28, dislocating the valve body 34 from the valve seat 36 against the force of the spring 38, as can be seen in FIG. 4. In this position air can, in principle, be sucked from the filtering apparatus, especially from its receptacle, through the pipe socket 24 and the open vacuum valve 30 to the vacuum source. When the adapter 14 is removed from the locking position the spring 38 resets the valve body 34 to its closing state.

However, since the valve body 34 as well as the pipe socket 24 usually are of circular shape there is the danger that the valve body 34 obstructs the exit of the pipe socket 24. Thus, the embodiment shown in the drawings provides a pipe socket 24 with apertured side walls closed to its valve side end. Air may stream through these apertures 42.

In order to provide a sealed connection of the adapter vacuum receiving port 22 to the base vacuum delivery port 28 the pipe socket 24 penetrates a sealing ring 44. In the embodiment shown in the drawings this sealing ring 44 is of elastomeric material and has walls which are, in a longitudinal section, V-shaped. This facilitates the penetration of the pipe socket 24 and provokes a self-sealing effect according to the so called Bernoulli Effect.

In the embodiment shown in the drawings the locking position is defined by a snap-lock between the adapter 14 and the cradle 26. The adapter 14 is provided with two opposed, resiliently pivotable levers 46. The upper rims of these levers 46 provide an adapter guiding rail 48 interacting with a corresponding base guiding rail 50 on the side rims of the cradle 26. These guiding rails 48, 50 provide for a guided transfer of the adapter 14 from the pre-locking position (FIGS. 1 and 3) to the locking position (FIGS. 2 and 4). The levers 46 are, at their upper rims, provided with projections 52. In the unsecured pre-locking position these projections are free from corresponding projections 54 on the base guiding rails 50. In the locking position, however, they engage behind each other to effectively lock the adapter 14 to the cradle 26. Due to the resilience of the levers 46 this locking is effected automatically when transferring the adapter 14 from the pre-locking position to the locking position. This transfer can easily be effected single-handed wherein fingers of the operator may engage behind special terraces 56 of the base 12.

The embodiment shown comprises two different pre-locking positions, namely the unsecured pre-locking position of FIGS. 1 and 3 and the secured pre-locking position of FIGS. 5 and 6. The upper rim of the lever 46 is provided with not only the protrusion 52 but also with an additional protrusion 53 equally suitable to establish a snap-lock connection when interacting with the corresponding protrusions 54 on the rim of the cradle 26. However, in this position no vacuum connection between the base vacuum delivery port 28 and the adapter vacuum receiving port 22 is established as can be easily seen from FIG. 6. Thus, in the illustrated embodiment the above mentioned guided transfers of the adapter from the (unsecured) pre-locking position of FIGS. 1 and 3 to the locking position of FIGS. 2 and 4 takes course via the secured pre-locking position of FIGS. 5 and 6. In practice, this secured pre-locking position is the preferred "waiting position" for prepared filtering apparatuses waiting to be connected to the vacuum to start the filtering process.

In order to open the snap-lock in the locking position the levers 46 may be manually, preferably single-handededly, pivoted to disengage the projections 52, 54. Then, the reset force of the spring 38 supports the transfer of the adapter 14 from its locking position into the direction of its pre-locking position while simultaneously closing the vacuum valve 30. By keeping the levers 46 pivoted the operator may overrun the secured pre-locking position and detach the filtering apparatus completely. Alternatively he or she may release the levers 46 in order to have filtering apparatus snap into the secured pre-locking position, e.g. to temporarily interrupt the filtering process.

The embodiments as discussed in the specific description and as shown in the drawings are illustrative examples only. In view of the disclosure given here, one skilled in the art is enabled to realize a wide spectrum of variations.

LIST OF REFERENCE NUMERALS 10 liquid filtering system
12 base
14 adapter
16 upper interface of 14
18 lower interface of 14
20 thread
22 adapter vacuum receiving port
24 pipe socket
26 cradle
28 base vacuum delivery port
30 vacuum valve
32 vacuum channel
34 valve body
36 valve seat
38 spring
40 gasket
42 aperture
44 sealing ring
46 lever
48 adapter guiding rail
50 base guiding rail
52 projection on 46
53 additional projection on 46
54 corresponding projection
56 terrace

What is claimed is:
1. A liquid filtering system comprising:
a filtering apparatus comprising:
a filter unit configured to hold a filter and to receive liquid to be filtered,
a receptacle for receiving filtered liquid, and
an adapter configured to couple the filter unit to the receptacle,
wherein the adapter comprises an adapter vacuum receiving port configured to couple to a base vacuum delivery port in order to apply a vacuum driving force for driving the liquid to be filtered through the filter and, as the filtered liquid, into the receptacle, and
a base comprising:
a cradle configured to receive the filtering apparatus, and
the base vacuum delivery port, configured to couple, on one side, to a vacuum source and, on another side, to the adapter vacuum receiving port,
wherein the cradle and the adapter comprise an interlocking mechanism configured to lock the filtering apparatus to the cradle in a locking position in which the adapter vacuum receiving port is sealingly coupled to the base vacuum delivery port,
wherein the base vacuum delivery port comprises a vacuum valve constituted as a valve automatically forced open from a normally closed position when the filtering apparatus is locked to the cradle, and
wherein the adapter vacuum receiving port comprises a pipe socket which is configured, in the locking position, to extend through a base port opening of the base vacuum delivery port and to dislocate a valve body of the vacuum valve from its closing position to its opening position.

2. The liquid filtering system according to claim 1, wherein the pipe socket is configured to dislocate the valve body against a reset force of a spring configured to apply a closing force to the valve body.

3. The liquid filtering system according to claim 1, wherein the vacuum valve comprises:
a vacuum channel ending at the base port opening, wherein the valve body is configured to coaxially dislocate within the vacuum channel, and
a valve seat against which the valve body is configured to sealingly press when in the closing position,
wherein the pipe socket is configured, in the locking position, to extend coaxially into the vacuum channel.

4. The liquid filtering system according to claim 1, wherein the base vacuum delivery port comprises a vacuum sealing ring axially between the base port opening and the vacuum valve, and wherein the sealing ring is configured, in the locking position, to be sealingly penetrated by the pipe socket.

5. The liquid filtering system according to claim 4, wherein the sealing ring is an elastomeric ring having a first axial end, a second axial end, and a central sector located axially between the first axial end and the second axial end, wherein its clear diameter at the first axial end and the second axial end is larger than an outer diameter of the pipe socket, and wherein its clear diameter at the central sector is as large as or smaller than the outer diameter of the pipe socket.

6. The liquid filtering system according to claim 4, wherein the vacuum valve comprises:
a vacuum channel ending at the base port opening, wherein the valve body is configured to coaxially dislocate within the vacuum channel, and
a valve seat against which the valve body is configured to sealingly press when in the closing position,
wherein the pipe socket is configured, in the locking position, to extend coaxially into the vacuum channel, and
wherein the side wall of the pipe socket comprises at least one aperture located, in the locking position, between the valve body and the sealing ring.

7. A liquid filtering system comprising:
a filtering apparatus comprising:
a filter unit configured to hold a filter and to receive liquid to be filtered,
a receptacle for receiving filtered liquid, and
an adapter configured to couple the filter unit to the receptacle,
wherein the adapter comprises an adapter vacuum receiving port configured to couple to a base vacuum delivery port in order to apply a vacuum driving force for driving the liquid to be filtered through the filter and, as the filtered liquid, into the receptacle, and
a base comprising:
a cradle configured to receive the filtering apparatus, and
the base vacuum delivery port, configured to couple, on one side, to a vacuum source and, on another side, to the adapter vacuum receiving port,
wherein the cradle and the adapter comprise an interlocking mechanism configured to lock the filtering apparatus to the cradle in a locking position in which the adapter vacuum receiving port is sealingly coupled to the base vacuum delivery port,
wherein the base vacuum delivery port comprises a vacuum valve constituted as a valve automatically forced open from a normally closed position when the filtering apparatus is locked to the cradle, and
wherein the interlocking mechanism of the adapter and the cradle is configured as a detachable snap-lock.

8. The liquid filtering system according to claim 7, wherein the detachable snap-lock comprises two mutually opposing, resiliently pivotable, dented levers, projections of which, in the locking position, engage behind corresponding projections of the cradle.

9. The liquid filtering system according to claim 7, wherein the cradle provides at least two receiving positions for the filtering apparatus, namely the locking position and at least one pre-locking position, and
wherein, in the pre-locking position, the interlocking mechanism is unlocked and the filtering apparatus is configured to transfer to the locking position by a manually forced, transversal shifting movement guided by mutually interacting guides of the adapter and of the cradle.

10. The liquid filtering system according to claim 9, wherein the cradle provides a secured pre-locking position, and
wherein, in the secured pre-locking position, additional locking elements are locked, to lock the filtering apparatus to the cradle without sealingly coupling the base vacuum delivery port to the adapter vacuum receiving port.

11. The liquid filtering system according to claim 1, wherein the pipe socket contains a sterile gas filter.

12. The liquid filtering system according to claim 11, wherein the gas filter is a hydrophobic gas filter.

13. A liquid filtering system comprising:
a filtering apparatus comprising:
a filter unit configured to hold a filter and to receive liquid to be filtered,
a receptacle for receiving filtered liquid, and
an adapter configured to couple the filter unit to the receptacle,
wherein the adapter comprises an adapter vacuum receiving port configured to couple to a base vacuum delivery port in order to apply a vacuum driving force for driving the liquid to be filtered through the filter and, as the filtered liquid, into the receptacle, and
a base comprising:

a cradle configured to receive the filtering apparatus, and the base vacuum delivery port, configured to couple, on one side, to a vacuum source and, on another side, to the adapter vacuum receiving port, wherein the cradle and the adapter comprise an interlocking mechanism configured to lock the filtering apparatus to the cradle in a locking position in which the adapter vacuum receiving port is sealingly coupled to the base vacuum delivery port, wherein the base vacuum delivery port comprises a vacuum valve constituted as a valve automatically forced open from a normally closed position when the filtering apparatus is locked to the cradle, and wherein the base comprises an additional vacuum valve configured to manually switch between an opening state and a closing state.

14. A liquid filtering system comprising:
 a filtering apparatus comprising:
  a filter unit configured to hold a filter and to receive liquid to be filtered,
  a receptacle for receiving filtered liquid, and
  an adapter configured to couple the filter unit to the receptacle,
 wherein the adapter comprises an adapter vacuum receiving port configured to couple to a base vacuum delivery port in order to apply a vacuum driving force for driving the liquid to be filtered through the filter and, as the filtered liquid, into the receptacle, and
 a base comprising:
  a cradle configured to receive the filtering apparatus, and
  the base vacuum delivery port, configured to couple, on one side, to a vacuum source and, on another side, to the adapter vacuum receiving port,
 wherein the cradle and the adapter comprise an interlocking mechanism configured to lock the filtering apparatus to the cradle in a locking position in which the adapter vacuum receiving port is sealingly coupled to the base vacuum delivery port,
 wherein the base vacuum delivery port comprises a vacuum valve constituted as a valve automatically forced open from a normally closed position when the filtering apparatus is locked to the cradle, and
 wherein the base forms part of a plurality of identical bases, each of which is fixed to a central base holder having a central vacuum conduit that is connected to the base vacuum delivery port of each one of the plurality of bases.

15. The liquid filtering system according to claim 14, wherein the central base holder is a rotatable stand having a central post containing the central vacuum conduit, and the plurality of bases extend radially from the post and exhibit their respective cradles radially outwardly.

* * * * *